(12) United States Patent
Noormohammadi

(10) Patent No.: US 11,745,434 B2
(45) Date of Patent: Sep. 5, 2023

(54) HOTMELT FOR SEALING ELECTRIC VEHICLE SUPPLY EQUIPMENT (EVSE)

(71) Applicant: Webasto Charging Systems, Inc., Monrovia, CA (US)

(72) Inventor: Nasser Noormohammadi, Pasadena, CA (US)

(73) Assignee: WEBASTO CHARGING SYSTEMS, INC., Monrovia, CA (US)

( * ) Notice: Subject to any disclaimer, the term of this patent is extended or adjusted under 35 U.S.C. 154(b) by 0 days.

(21) Appl. No.: 17/357,536

(22) Filed: Jun. 24, 2021

(65) Prior Publication Data

US 2022/0410498 A1     Dec. 29, 2022

(51) Int. Cl.

| | |
|---|---|
| *B29C 65/42* | (2006.01) |
| *B60L 53/16* | (2019.01) |
| *B29C 65/70* | (2006.01) |
| *B29C 65/78* | (2006.01) |
| *B29C 65/00* | (2006.01) |
| *H01R 13/436* | (2006.01) |
| *H01R 13/56* | (2006.01) |
| *H01R 13/58* | (2006.01) |
| *B29L 31/36* | (2006.01) |

(52) U.S. Cl.
CPC ............. *B29C 65/42* (2013.01); *B29C 65/70* (2013.01); *B29C 65/7844* (2013.01); *B29C 66/5221* (2013.01); *B60L 53/16* (2019.02); *H01R 13/436* (2013.01); *H01R 13/562* (2013.01); *H01R 13/5845* (2013.01); *B29L 2031/36* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 6,225,153 B1 | 5/2001 | Neblett et al. | |
| 8,747,138 B2 * | 6/2014 | Brune | H01R 13/5202 439/278 |
| 9,209,556 B2 * | 12/2015 | Potterf | H01R 13/504 |

(Continued)

FOREIGN PATENT DOCUMENTS

| | | |
|---|---|---|
| WO | 2011126924 A1 | 10/2011 |
| WO | 2017029538 A1 | 2/2017 |

OTHER PUBLICATIONS

International Search Report and Written Opinion for PCT/US22/34681, dated Dec. 8, 2022.

*Primary Examiner* — Ross N Gushi
(74) *Attorney, Agent, or Firm* — Concept IP LLP; Michael Zarrabian

(57) ABSTRACT

Systems and methods for a coupler including: a cable comprising a bend relief disposed at an end of the cable and one or more wires; a socket comprising one or more pins and one or more socket terminals, where the one or more pins are electrically connected to the one or more socket terminals; and a housing body disposed between the cable and the socket, where the housing body comprises a portion of the bend relief and the one or more wires connected to the one or more socket terminals, and where at least a portion of the housing body is made of hot melt such that the housing body encapsulates the portion of the bend relief, the one or more socket terminals, and the one or more wires connected to the one or more socket terminals.

13 Claims, 17 Drawing Sheets

(56) References Cited

U.S. PATENT DOCUMENTS

| | | | |
|---|---|---|---|
| 9,761,994 B2* | 9/2017 | Saydyk | G01V 1/04 |
| 9,768,548 B2* | 9/2017 | Pegel | H01R 13/5812 |
| 10,931,046 B2* | 2/2021 | Komori | H01R 12/716 |
| 2016/0181755 A1 | 6/2016 | Kao et al. | |

* cited by examiner

HOTMELT FOR SEALING ELECTRIC VEHICLE SUPPLY EQUIPMENT (EVSE)

TECHNICAL FIELD

Embodiments relate generally to electrical connectors, and more particularly to sealing an electric vehicle supply equipment (EVSE).

BACKGROUND

An electrical connector is an apparatus used to transfer electricity from a power supply to a utility device, such as an electrical vehicle (EV). Electrical connectors generally have an internal connection that electrically connects one end of an electrical connector to the other end of the electrical connector. As electrical connectors may be used outdoors, the internal connection may face environmental hazards such as water and dust. In addition, electrical connectors may be accidentally dropped during the charging process, causing the internal connection to receive shock-induced vibrations.

SUMMARY

A coupler embodiment may include: a cable, where the cable comprises a bend relief disposed at an end of the cable and one or more wires; a socket, where the socket comprises one or more pins and one or more socket terminal, where the one or more pins are electrically connected to the one or more socket terminals; and a housing body disposed between the cable and the socket, where the housing body comprises a portion of the bend relief and the one or more wires connected to the one or more socket terminals, and where at least a portion of the housing body may be made of hot melt such that the housing body encapsulates the portion of the bend relief, the one or more socket terminals, and the one or more wires connected to the one or more socket terminals.

In additional coupler embodiments, the cable comprises a spacer disposed proximate an end of the cable. In additional coupler embodiments, the socket comprises a chamber defined by an inner surface of the socket. In additional coupler embodiments, at least a portion of the one or more pins are disposed within the chamber, and where the one or more pins are electrically connected to the cable.

Additional coupler embodiments may include a locking mechanism configured to secure the coupler to an electric vehicle (EV) connector. Additional coupler embodiments may include a locking feature, where the locking feature may be an aperture disposed in the housing body, and where inserting an object into the locking feature prevents movement of the locking mechanism.

In additional coupler embodiments, the housing body may be formed by injecting the hot melt into a mold in an opening between the socket and the cable. In additional coupler embodiments, the hot melt may be injected at a low pressure.

A method embodiment of assembling a coupler may include: placing a coupler assembly into a mold comprising one or more sections, where the coupler assembly comprises a socket electrically connected one or more wires of a cable and a bend relief disposed at an end of the cable; closing the one or more sections of the mold about the coupler assembly; injecting hot melt into the closed mold in an opening between the socket and the cable; cooling the hot melt to form at least a portion of a housing body of a coupler; and removing the coupler from the mold.

In additional method embodiments, the hot melt may be injected into the mold at a low pressure. In additional method embodiments, the cable comprises a spacer disposed proximate an end of the cable. In additional method embodiments, the socket comprises a chamber defined by an inner surface of the socket, and where one or more pins are disposed within the chamber. In additional method embodiments, the one or more pins are electrically connected to the one or more wires of the cable.

Another method embodiment of assembling a coupler may include: connecting one or more wires of a cable to one or more terminals of the vehicle interface; filling a cylinder of the vehicle interface with hot melt at a first connector portion to encapsulate the connection between the one or more wires and the one or more terminals; placing the vehicle interface in a housing shell proximate a first end of the housing shell; closing the housing shell; and injecting a hot melt into a second connector portion proximate a second end of the housing shell distal from the first end of the housing shell, where the hot melt encapsulates at least a portion of the cable for strain relief.

In additional method embodiments, the hot melt may be injected into the first connector portion at a low pressure. In additional method embodiments, the hot melt may be injected into the second connector portion at a low pressure. In additional method embodiments, the housing shell may be formed of injection molded plastic. In additional method embodiments, the housing shell comprises two pieces in a clamshell design.

In additional method embodiments, the hot melt in the second connector potion forms about one or more location pins. In additional method embodiments, the one or more location pins connect the two pieces of the housing shell, and where the one or more location pins prevent lateral movement and rotation of the second connector portion relative to the housing shell.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1A:
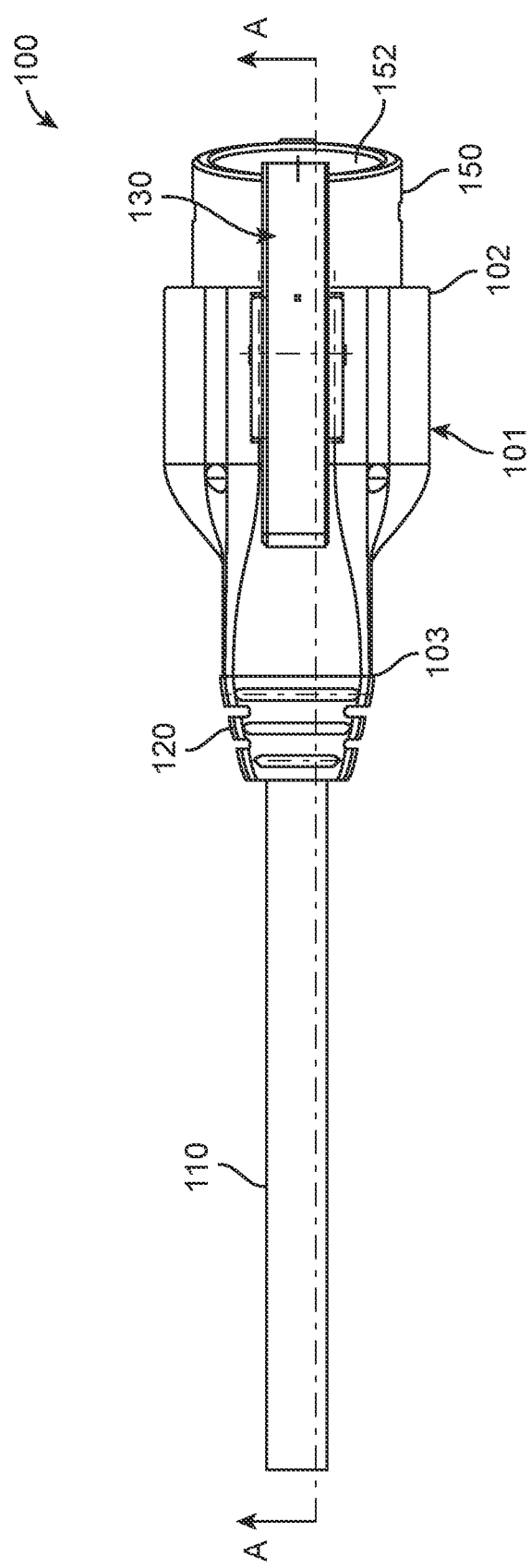
FIG. 1A depicts a top view of a coupler utilizing hot melt for the housing body, according to an embodiment of the disclosure.
Figure 1B:
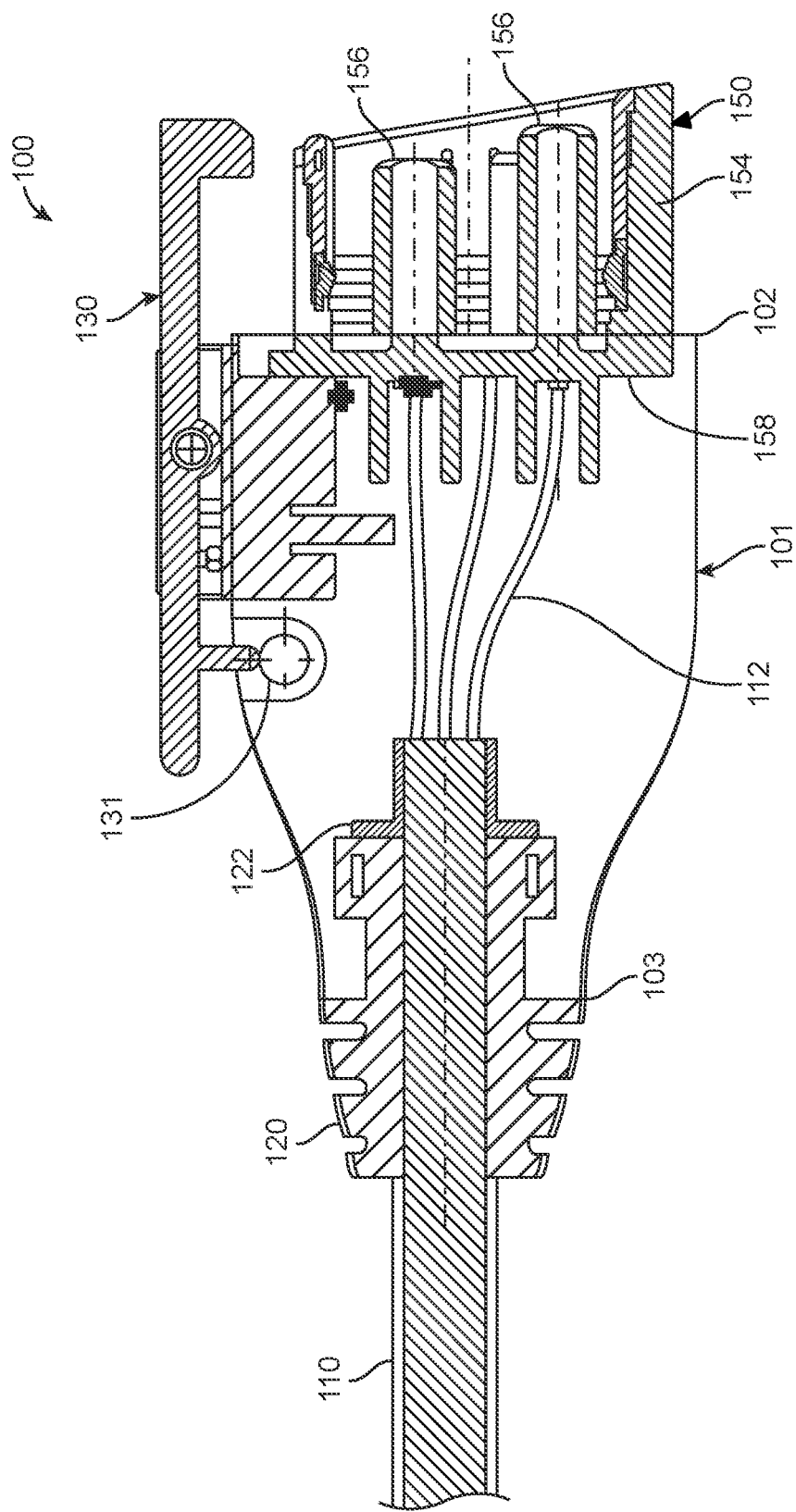
FIG. 1B depicts a cross-sectional view of the coupler of FIG. 1B about line A-A, according to an embodiment of the disclosure.
Figure 2A:
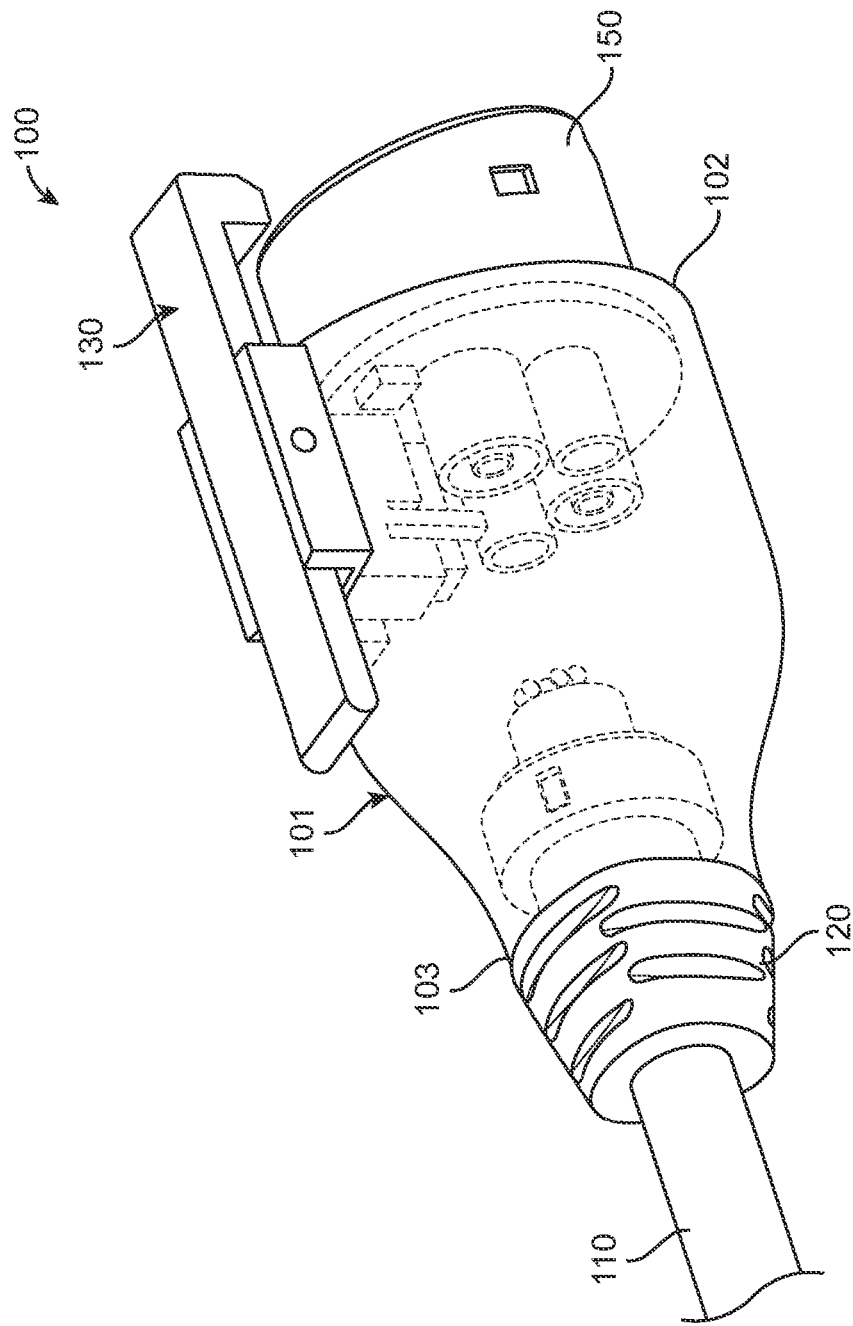
FIG. 2A depicts a rear perspective partially transparent view of the coupler of FIG. 1A, according to an embodiment of the disclosure.
Figure 2B:
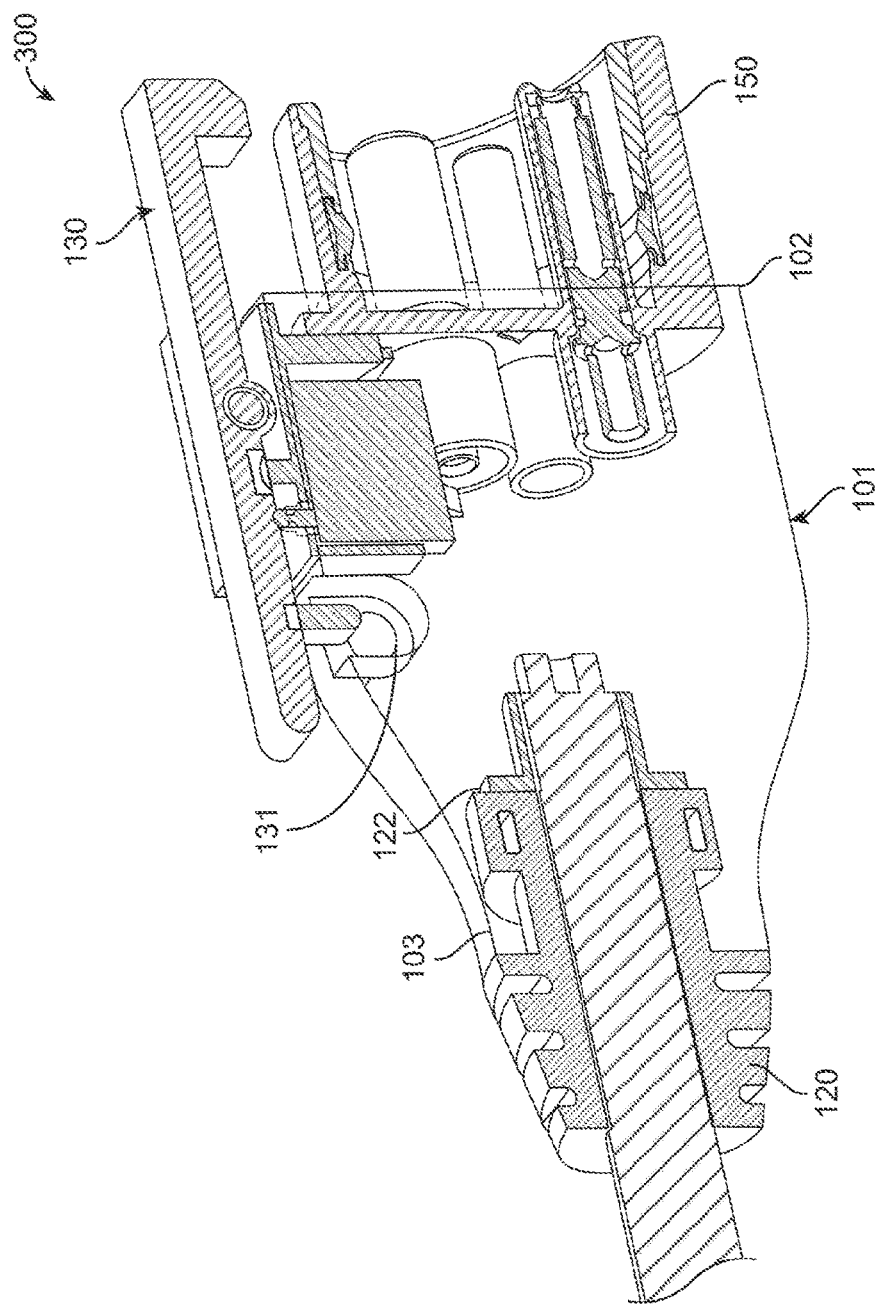
FIG. 2B depicts a rear perspective cross-sectional view of the protective system of FIG. 2A, according to an embodiment of the disclosure.
Figure 3:
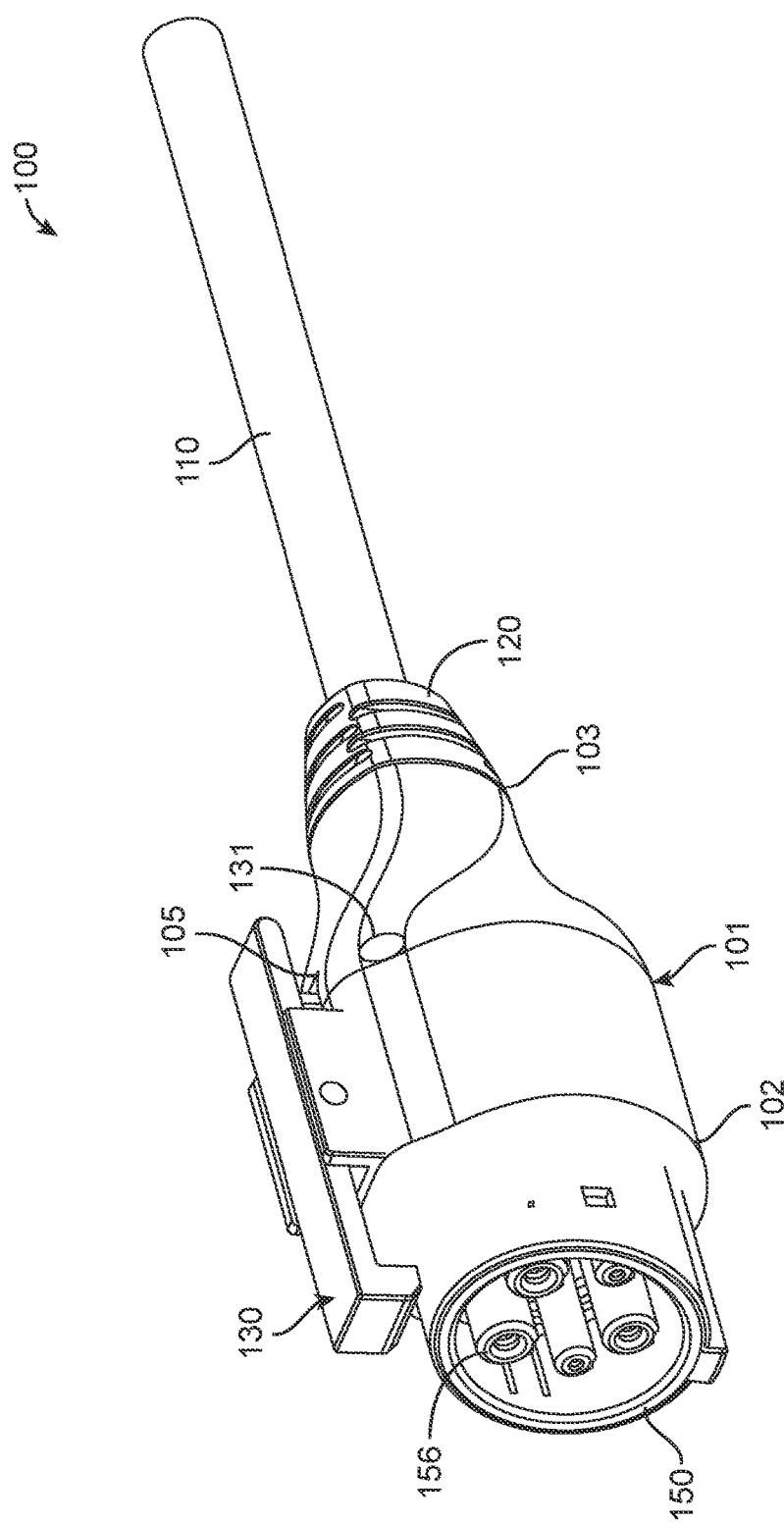
FIG. 3 depicts a front perspective view of the coupler of FIG. 1A, according to an embodiment of the disclosure.

The present system and method protects the internal connections within a coupler, such as used as an interface between an electric vehicle (EV) and a charging point. The disclosed system and method uses a hot melt adhesive (HMA) or hot melt, which is a form of thermoplastic adhesive, to seal one or more parts of the coupler.

Couplers may be susceptible to water ingress when used outside. Couplers may also be vulnerable to environmental factors and UV light when used outside. Couplers may sustain damage if dropped, left on the floor, walked over, driven over, or otherwise damaged during use and/or storage. In some cases, couplers may require chemical resistance when used in areas where a portion of the coupler may be exposed to chemicals. It is desired to have a water-resistant, UV-protected, impact resistant, and chemical resistant coupler while still maintaining a low overall cost of manufacturing.

In one embodiment, the disclosed coupler may utilize hot melt for at least a portion of the housing body. In other embodiments, the disclosed coupler may utilize hot melt in one or more key connection areas. The use of hot melt may reduce the number of required components in a coupler, and this manufacturing cost, while providing superior water-resistance, UV-protection, impact resistance, and chemical resistance. Using hot melt may result in no harmful fumes from the molding process. Application viscosity may range from 1,000 to 10,000 cps, in some embodiments. Application pressure may range from 20 to 500 psi, in some embodiments. Performance temperature may range from −65° C. to 200° C. in some embodiments. The hot melt used may have excellent adhesive properties to the cable, the connectors and all internal parts. The hot melt used may be solvent-free, may not require any additional safety labels to be compliant with standards, and may comply with flammability requirements. The hot melt used may have a long shelf life, such as at least two years. The hot melt used may be RoHS and REACH compliant.

Referring to FIGS. 1A, 1B, 2A, 2B, 3, 5, and 6, a coupler 100 is shown, according to an embodiment of the disclosure. The coupler 100 may protect an electrical connection between a cable electrical connector and one or more socket terminals 158 from damage due to water intrusion, dust, UV light, impact, and chemicals. The coupler 100 may be used to connect a power source to an electric vehicle (EV) so as to provide power for charging the EV.

The coupler 100 may include a cable 110. The cable may include a cable jacket and one or more inner wires. Each of the one or more inner wires may contain a wire insulation. The cable 110 may be attached to the coupler via a cable bend relief 120. The cable bend relief 120 may offer mechanical support to the cable 110 and protect the cable 110 from tight bends and fatigue loading proximate a housing body 101 of the coupler 100. In some embodiments, a portion of the cable bend relief 120 may be disposed outside of the housing body 101. In additional embodiment, a portion of the cable bend relief 120 may be disposed within the housing body 101. The coupler 100 may also include a spacer 122. The spacer 122 may be disposed proximate the cable bend relief 120 and prohibit the entry of hot melt into a body of the cable 110. In some embodiments, the spacer 122 may provide compression at an end of a cable disposed within the housing body 101 so as to inhibit a flow of hot melt into the cable 110. The one or more wires 112 of the cable 110 may exit the cable 110 proximate the spacer 122.

The coupler 100 also includes a socket 150 for interfacing with an EV. The socket 150 may include an inner surface 152 defining a chamber 154. One or more pins 156 may be disposed within the chamber 154. The one or more pins 156 are adapted to extend inside a corresponding one or more receptacles, such as in an EV. The one or more pins 156 may be electrically connected to the cable 110 via one or more socket terminals 158. The one or more socket terminals 158 may be electrically connected to the one or more wires 112 of the cable 110 that exit the cable 110 proximate the spacer 122.

The coupler 100 may include the housing body 101. A first end 102 of the housing body 101 may be proximate the socket 150. A second end 103 of the housing body 101 may be proximate the cable 110. The first end 102 of the housing body 101 may be distal from the second end 103 of the housing body 101. One or more wires 112 may exit the cable 110 proximate the spacer 122 and pass through the housing body 101 to electrically connect the one or more wires 112 of the cable 110 and the one or more socket terminals 158.

The housing body 101 may be formed from hot melt. The hot melt may encapsulate a portion of the bend relief 120, the spacer 122, the one or more socket terminals 158, and the one or more wires 112. The housing body 101 formed from hot melt may provide superior water-resistance, UV-protection, impact resistance, and chemical resistance as compared to a standard coupler. By forming the housing body 101 from hot melt, the number of parts required to ensure a sealed electrical connection is reduced as compared to a standard coupler. One coupler may use potting, which is a liquid that or semi-liquid pour that solidifies. The hot melt both seals the electrical connection and acts as a housing for the coupler. In some embodiments, the hot melt may form an entire housing body 101. In other embodiments, the hot melt may form a portion of the housing body 101.

A locking mechanism 130 may be attached to the housing body 101. The locking mechanism may be used to secure the coupler to another object when in use, such as to an EV during charging of the EV to prevent an accidental disconnect. A locking feature 131 may be disposed in the housing body. In some embodiments, the locking feature may be an aperture disposed in the housing body. A portion of the locking mechanism 130 may move into a portion of the locking feature 131 during movement of the locking mechanism, such as while engaging and disengaging the coupler 100 to an EV. Inserting an object, such as a lock, into the locking feature is configured to prevent movement of the locking mechanism such that the portion of the locking mechanism 130 is not able to move into the portion of the locking feature 131. The locking feature 131 may be used with a lock so as to prevent the coupler 100 from being attached to an EV and/or detached from an EV.

Figure 4:
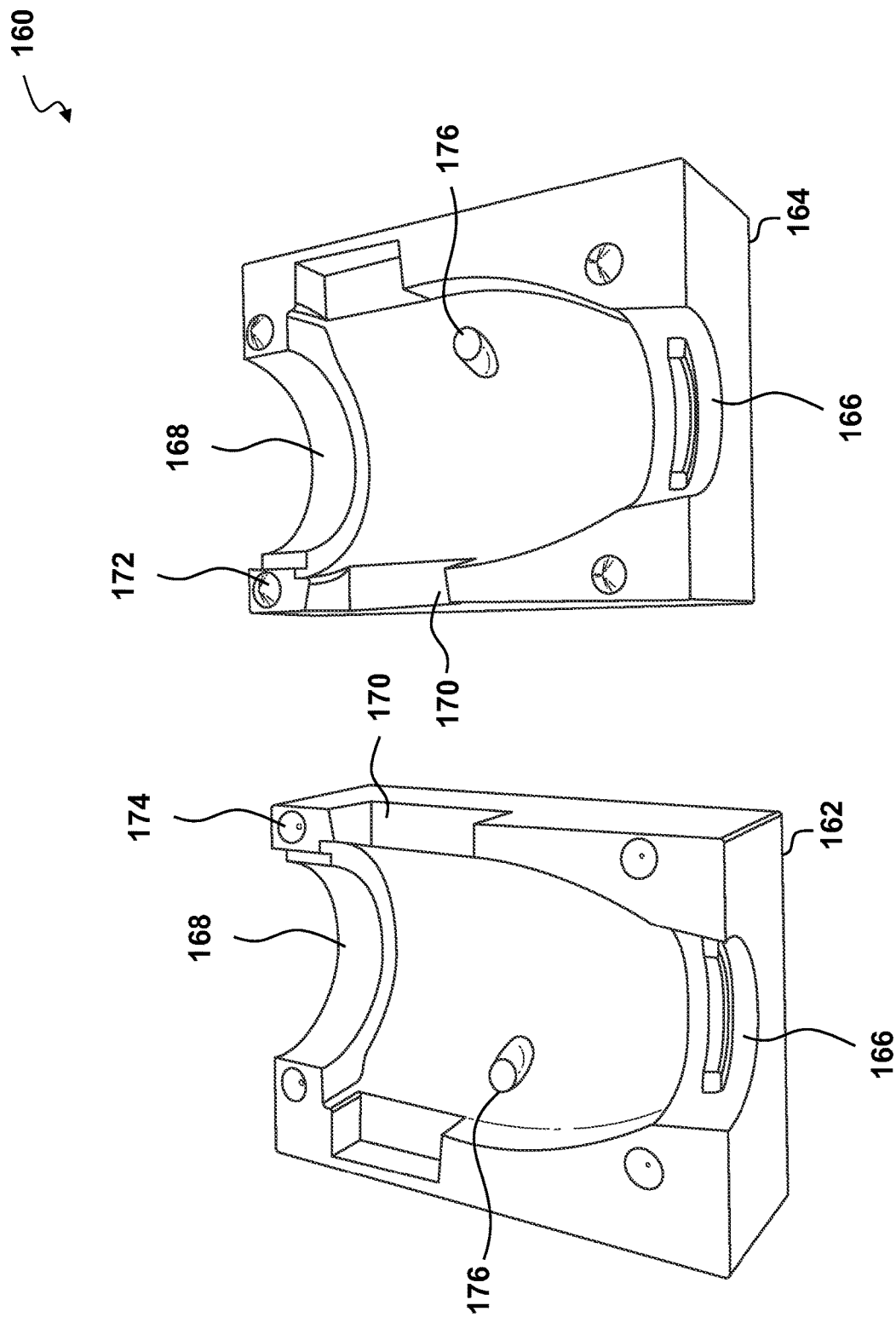
FIG. 4 depicts a perspective view of a mold used to create the coupler of FIG. 1A, according to an embodiment of the disclosure.
Figure 5:
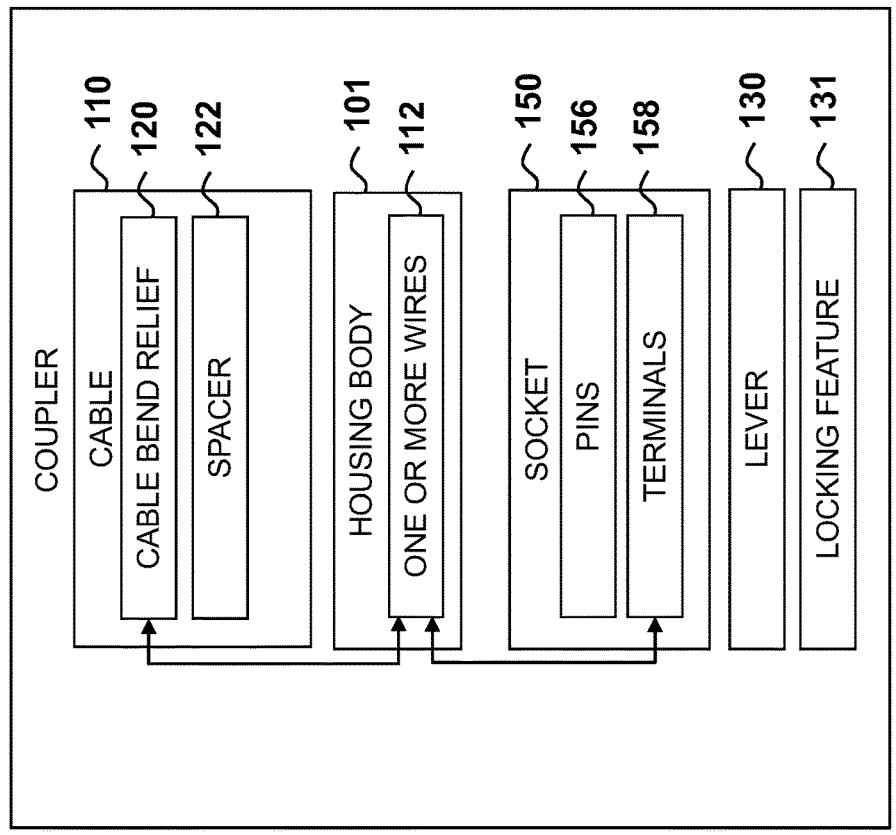
FIG. 5 is a high-level block diagram of a coupler, according to an embodiment of the disclosure.

FIG. 4 depicts a perspective view of a mold 160 used to create the coupler of FIG. 1A, according to an embodiment of the disclosure. The mold 160 may include one or more portions, such as a first mold portion 162 and a second mold portion 164. Each mold portion 162, 164 may include a bottom opening 166 for receiving a wire (110, FIG. 2A); a top opening 168 for receiving a socket (150, FIG. 2A); and a fill opening 170 for injecting hot melt into a cavity of the mold 160 so as to encapsulate the connection between the one or more wires and the socket and to form a body of the coupler. The fill opening 170 is only shown for reference and have other shapes and sizes according to the desired coupler body shape. In some embodiments, the fill opening 170 may create an extended portion of hot melt that may be sanded down, cut off, or otherwise removed once the hot melt has cured. In some embodiments, the fill opening may be cut-off and/or sanded down so as to remove any protrusion resulting in the coupler body from filling hot melt through the fill opening 170. The first mold portion 162 may include one or more indents 174 to align with one or more protrusions 172 of the second mold portion 164. The mold may include one or more posts or protrusions 176 to create a locking mechanism (130, FIG. 1B). The mold 160 allows the coupler to be electrically connected and then for a hot melt body to be formed about the electrical connections so as to form a durable housing from hot melt that prevents damage due to water intrusion, dust, UV light, impact, and chemicals.

Figure 6:
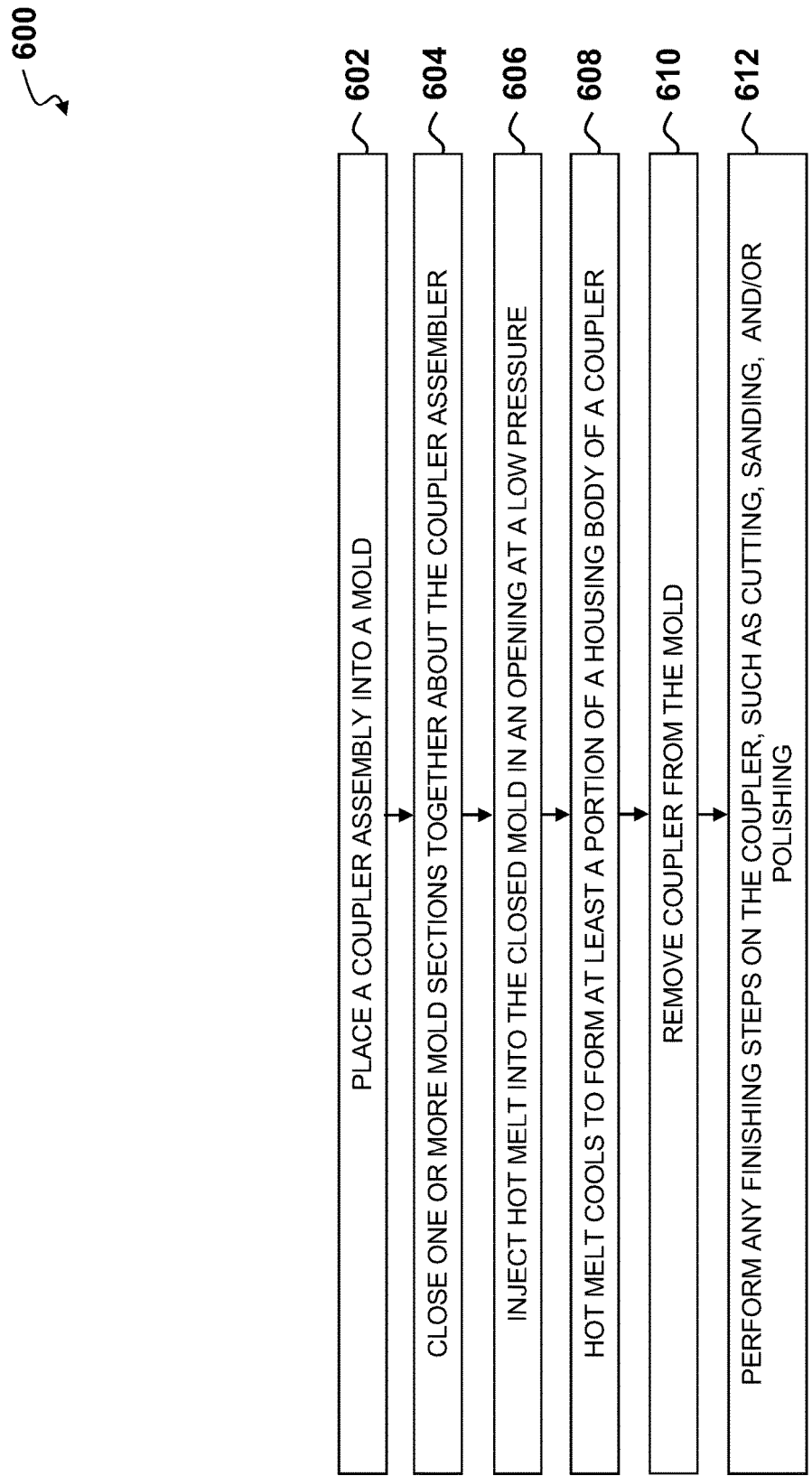
FIG. 6 is a flowchart for a method of forming a coupler with a hot melt housing body, according to an embodiment of the disclosure.
Figure 7:
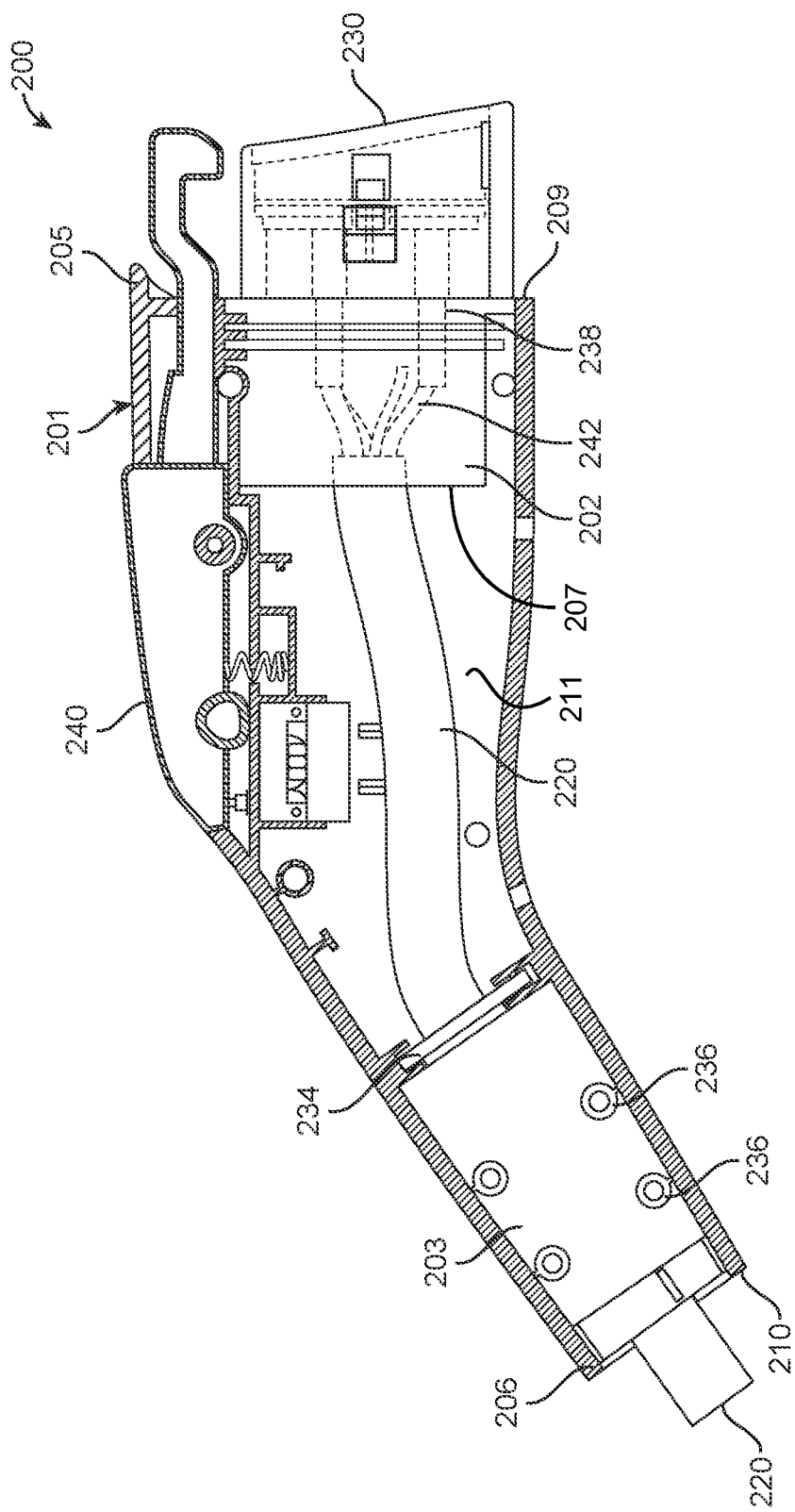
FIG. 7 depicts a side view of an alternate coupler with a housing shell partially exposed, according to an embodiment of the disclosure.
Figure 8:
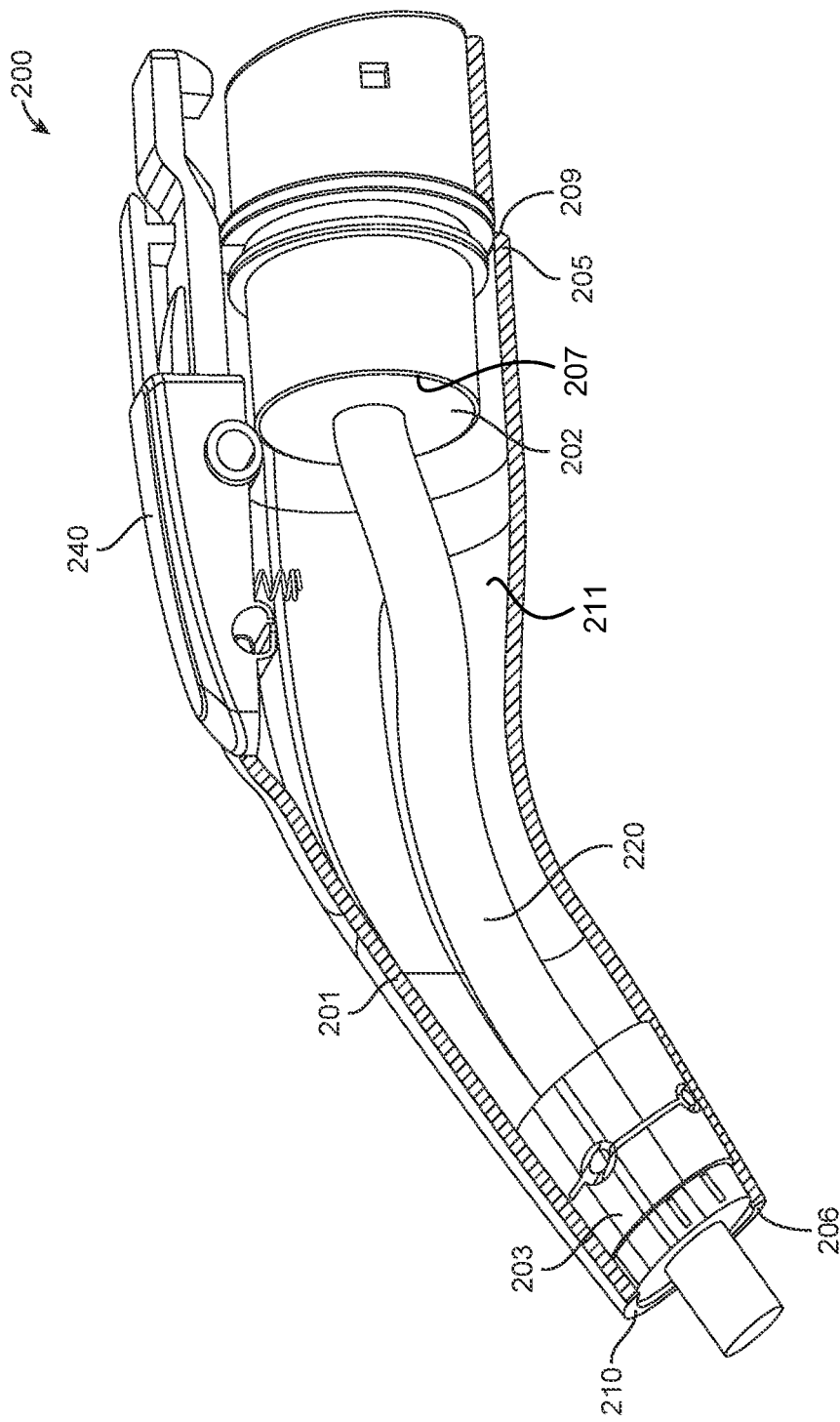
FIG. 8 depicts a perspective view of the alternate coupler of FIG. 7 with the housing shell partially exposed, according to an embodiment of the disclosure.
Figure 9:
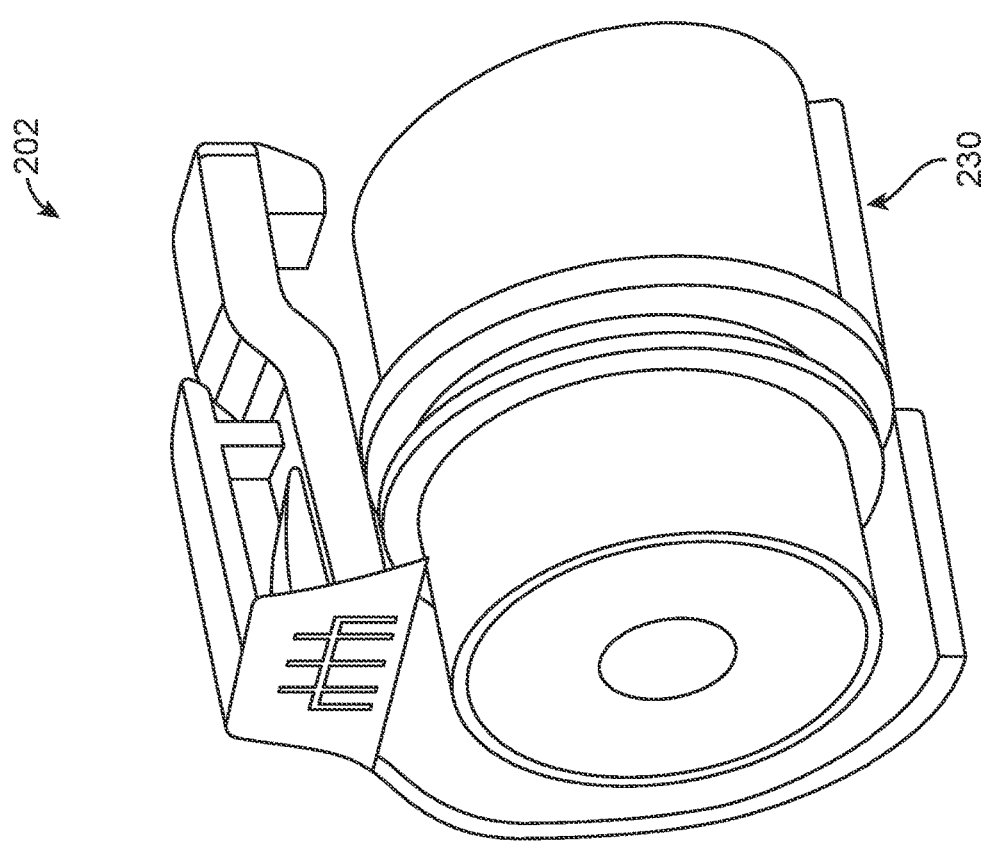
FIG. 9 depicts a perspective view of a portion of the first connector portion of the alternate coupler of FIG. 7, according to an embodiment of the disclosure.
Figure 10:
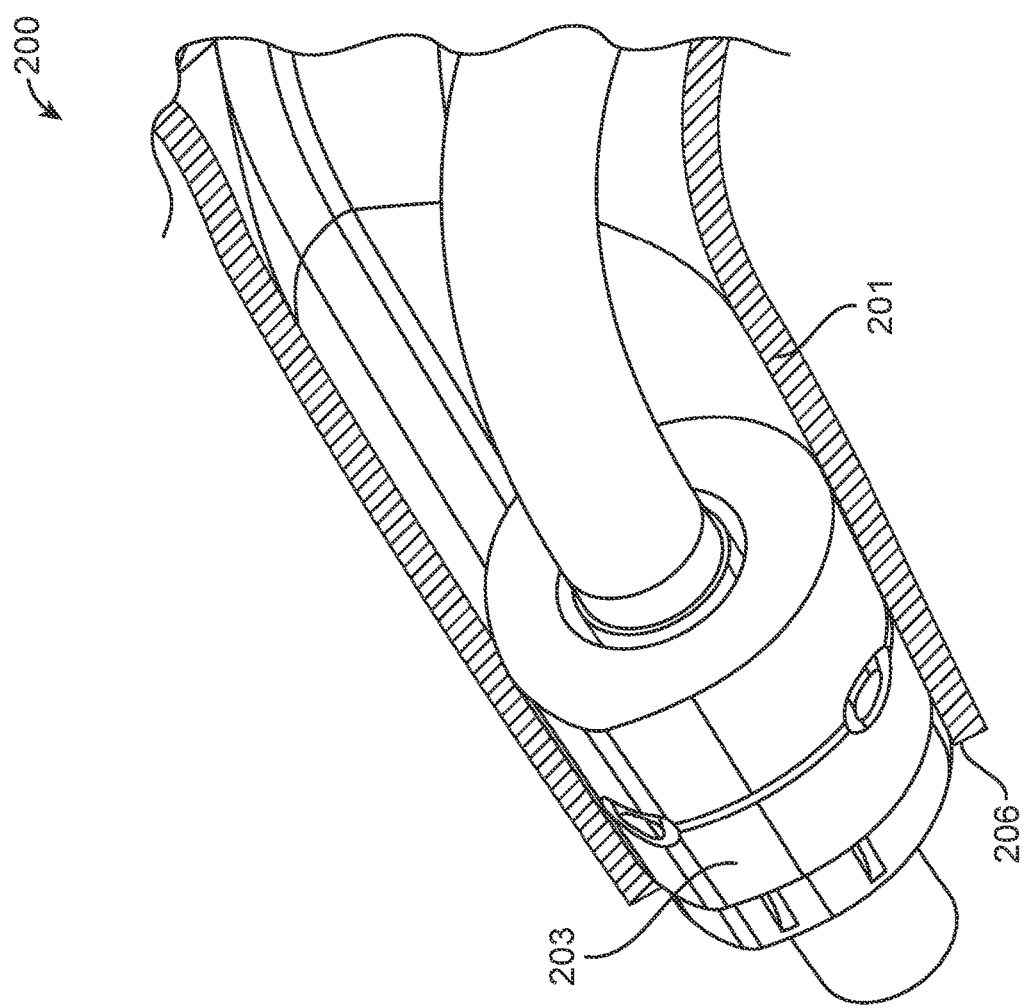
FIG. 10 depicts a perspective view of a second connector portion in a partially exposed housing shell of the alternate coupler of FIG. 7, according to an embodiment of the disclosure.
Figure 11:
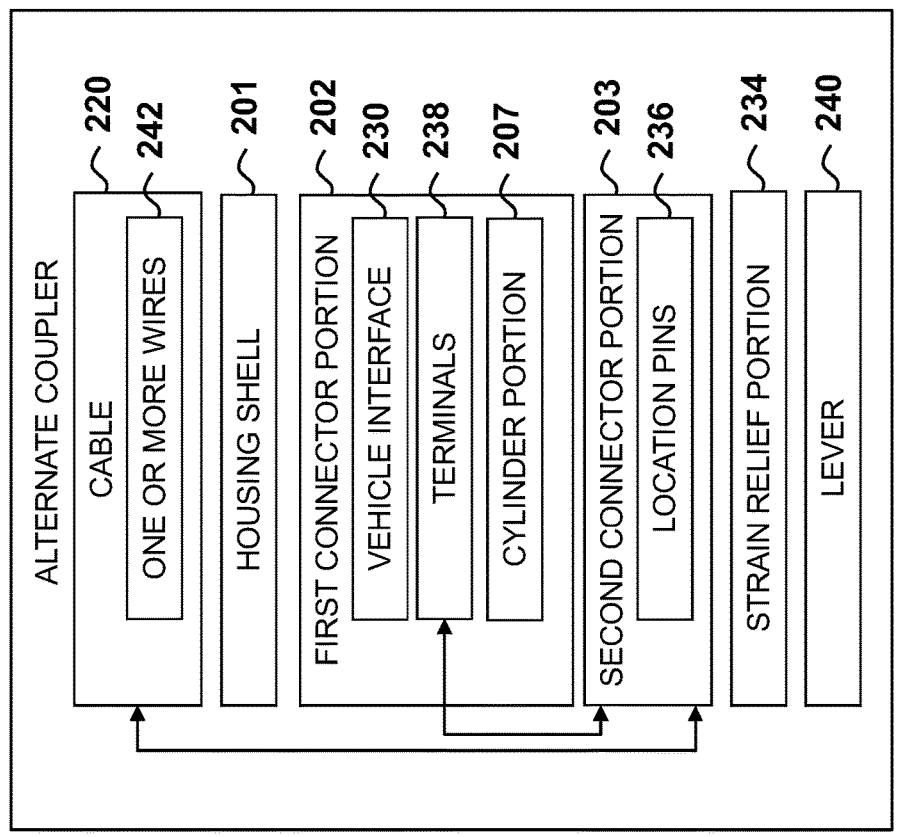
FIG. 11 is a high-level block diagram of an alternate coupler, according to an embodiment of the disclosure.

FIG. 6 is a flowchart for a method 600 of forming a coupler with a hot melt housing body, such as shown in FIGS. 1A, 1B, 2A, 2B, 3, and 5. The method 600 may include placing a coupler assembly into a mold, such as shown in FIG. 4 (step 602). The coupler assembly may include one or more components of the coupler, such as the cable, a microswitch, a socket, and any wires connected to the terminal of the socket. In some embodiments, the one or more wires of the cable may already be connected to the one or more terminals when the coupler assembly is placed into the mold. In other embodiments, the one or more wires of the cable may be attached to the one or more terminals once the coupler assembly is in the mold. The method 600 may then include closing the one or more mold sections together about the coupler assembly. The mold may include one or more portions. In one embodiment, the coupler assembly may be placed into one of the one or more mold portions and any remaining portions of the mold may be closed about the coupler assembly so as to encapsulate the coupler assembly within the mold. A portion of the socket and cable may extend out from the mold. The method 600 may then include injecting hot melt into the mold in an opening between the socket and the cable (step 606). The hot melt may be injected into the mold at a low pressure. The method 600 may then include cooling the hot melt to form at least a portion of a housing body of a coupler (step 608). In some embodiments, the hot melt melting temperature may be about 185 Celsius. In some embodiments, the coupler may be required to remain solid at temperatures up to 105 Celsius. The method 600 may then include removing the coupler from the mold (step 610). The removed coupler includes the cable and socket connected by a body at least partially formed from the hot melt. The method 612 may then include performing any finishing steps on the coupler (step 612). In some embodiments, the finishing steps may include cutting any left over hot melt material, such as hot melt extending from the body of the coupler at the injection site. In other embodiments, the finishing steps may include sanding and/or polishing the hot melt to achieve a desired finish.

Referring to FIGS. 7, 8, 9, 10, and 11, an alternate coupler 200 is shown, according to an embodiment of the disclosure. The coupler 200 may protect an electrical connection between one or more wires 242 of a cable 220 and one or more terminals 238 from damage due to water intrusion, dust, UV light, impact, and chemicals. The coupler 200 may be used to connect a power source to an electric vehicle (EV) so as to provide power for charging the EV.

The alternate coupler 200 of FIGS. 7, 8, 9, 10, and 11 may differ from the coupler 100 of FIGS. 1A, 1B, 2A, 2B, 3, and 5 in that the alternate coupler 200 may include a molded plastic housing shell 201 such that no, or minimal, hot melt is visible to a user of the alternate coupler 200. The alternate coupler 200 provides superior water-resistance, UV-protection, impact resistance, and chemical resistance as compared to a standard coupler while maintaining a desired outside appearance to the user.

The coupler 200 may include a housing shell 201. The housing shell 201 may be formed of injection molded plastic. Other housing shell 201 materials are possible and contemplated. The housing shell 201 may include a first housing shell end 205 having a first housing shell opening 209. The housing shell may also include a second housing shell end 206 having a second housing shell opening 210. The first housing shell end 205 may be distal from the second housing shell end 206. In some embodiments, hot melt may be injected into the second connector portion 203 proximate the second housing shell opening 210 so as to fill hot melt within the housing shell 201 up to the strain relief portion 234.

A first connector portion 202 may include a vehicle interface 230 and one or more terminals 238. The one or more terminals 238 may receive the one or more wires 242 of the cable 220 within a cylinder portion 207 of the vehicle interface 230. The first connector portion 202 may be located proximate the first housing shell opening 209. The first connector portion 202 may include hot melt filled within an outer wall of a socket prior to placing the socket within the housing shell 201.

A second connector portion 203 may be located proximate the second housing shell opening 210. A strain relief portion 234 may be located proximate the second connector portion. The strain relief portion 234 may be used to fill the second connector portion 203 with hot melt without allowing hot melt into the housing body between the second connector portion 203 and the first connector portion 202. The strain relief portion 234 may ensure that pressure and/or strain on the wire 220 is not transmitted to the one or more terminals 238 in the first connector portion. The second connector portion 203 may include one or more location pins 236. The one or more location pins 236 may be used to connect the two halves of the housing shell 201. The one or more location pins 236 may also ensure that the second connector portion is held in place to prevent lateral movement and/or rotation of the second connector portion 203. The second connector portion is filled with hot melt to secure the cable 220 relative to the housing shell 201. An open area 211 in the coupler 200 between the first connector portion 202 and the second connector portion 203 may not contain any hot melt so as to reduce the amount of hot melt needed and/or to reduce an overall weight of the coupler 200.

The cable 220 may enter the housing shell 201 at the second housing shell opening 210. The cable 220 is then secured to the housing shell 201 via the second connector potion 203. The cable, with strain relief with the second connector portion 203, is then connected to the vehicle interface 230. At least a portion of the vehicle interface, the one or more terminals 238, and the one or more wires 242 of the cable 220 are encapsulated in hot melt in the first connector portion 202.

By securing the electrical connection at the first connector potion 202 and providing strain relief at the second connector portion 203, the coupler 200 is able to provides superior water-resistance, UV-protection, impact resistance, and chemical resistance as compared to a standard coupler.

Figure 12:
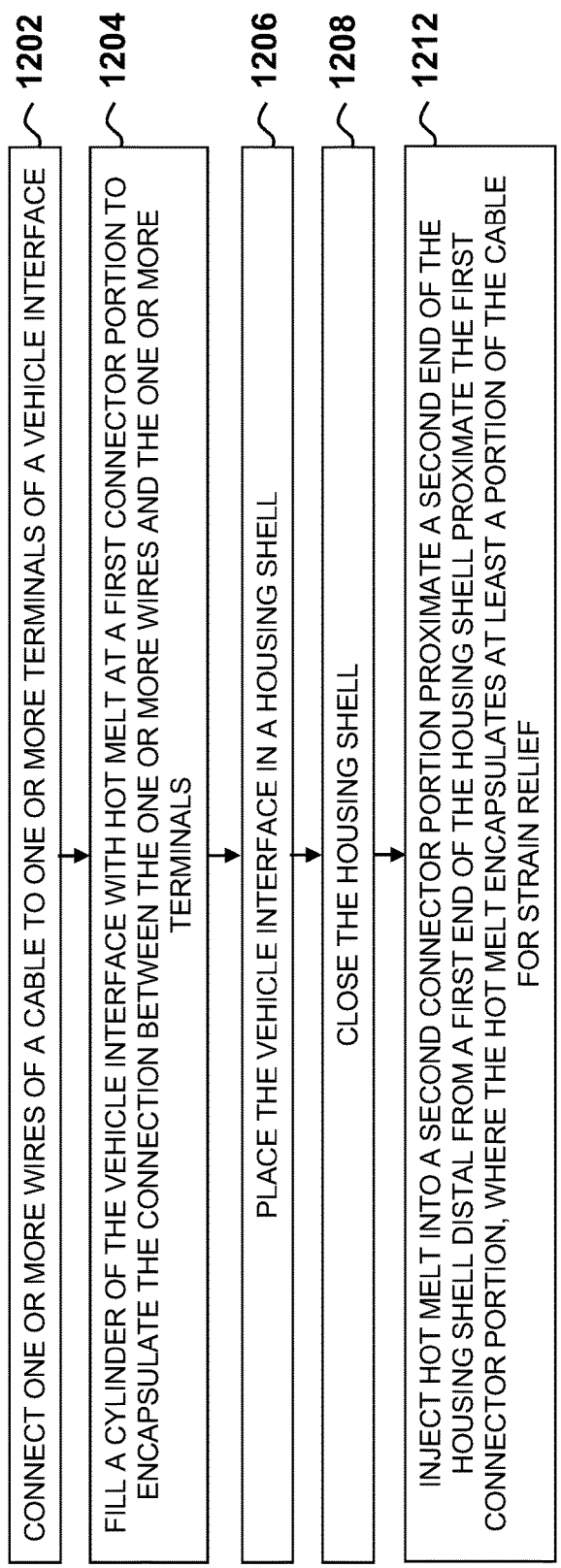
FIG. 12 is a flowchart for a method of forming a first connector portion and a second connector portion with a hot melt inside of a housing body of an alternate coupler, according to an embodiment of the disclosure.

FIG. 12 is a flowchart for a method 1200 of forming a first connector portion and a second connector portion with a hot melt inside of a housing body of an alternate coupler, according to an embodiment of the disclosure. The method 1200 may connecting one or more wires of a cable to one or more terminals of a vehicle interface (step 1202). The method 1200 may then include filling a cylinder of the vehicle interface with hot melt at a first connector portion to encapsulate the connection between the one or more wires and the one or more terminals (step 1204). The cylinder may be disposed opposite a socket side of the vehicle interface. The cylinder may be a closed shape so as to receive hot melt and hold the hot melt in place until it cools. Once the hot melt in the first connector portion has cooled and set, the method 1200 may then include placing the vehicle interface in the housing shell (step 1206). The method 1200 may then include closing the housing shell (1208). In some embodiments, the housing shell may be in two parts, such that the housing shell forms a clamshell design. The method 1200 may then include injecting hot melt into a second connector proximate a second end of the housing shell distal from a first end of the housing shell proximate the first connector portion (step 1212). The hot melt may encapsulate at least a portion of the cable for strain relief. One or more features in the second connector portion may prevent lateral movement and rotation movements relative to the housing once the hot melt has cooled and set. The hot melt in the second connector portion may be injected into the second connector portion from outside of the housing shell. In some embodiments, one or more connector portions may be filled with hot melt prior to assembly of the housing shell. In other embodiments, one or more connector portions may be filled with hot melt after assembly of the housing shell, such as by injecting hot melt into the housing shell. One or more retention components, such as a strain relief portion, may be placed within the housing shell so as to limit flow of hot melt injected into the housing shell to a specified area. While two connector portions are disclosed, any number of connector portions are possible and contemplated based on a desired strain relief, number of electrical connections, areas requiring protection from ingress or dust, and the like.

Figure 13:
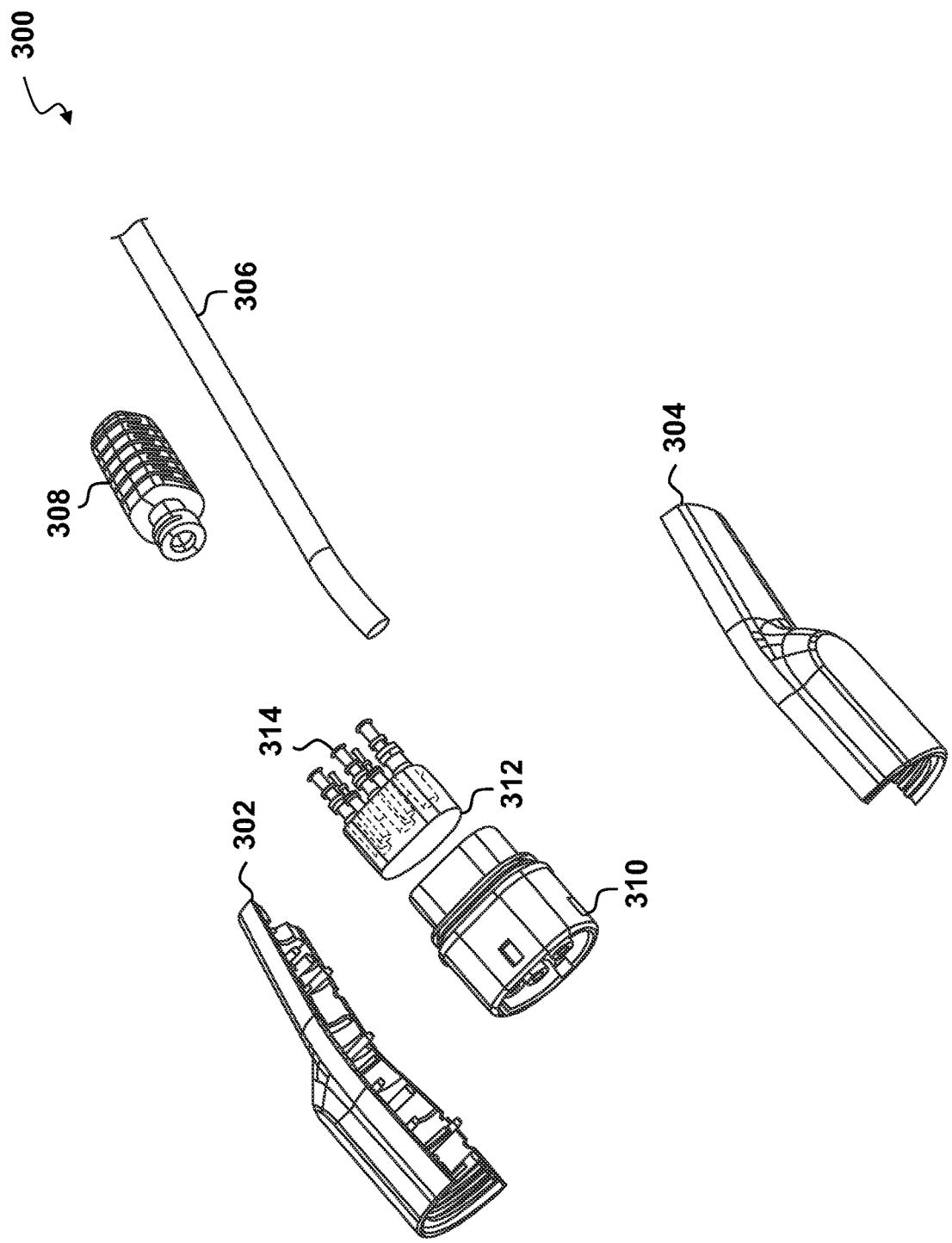
FIG. 13 depicts a perspective exploded view of an alternate coupler with a hot melt portion in a key connection area, according to an embodiment of the disclosure.
Figure 14:
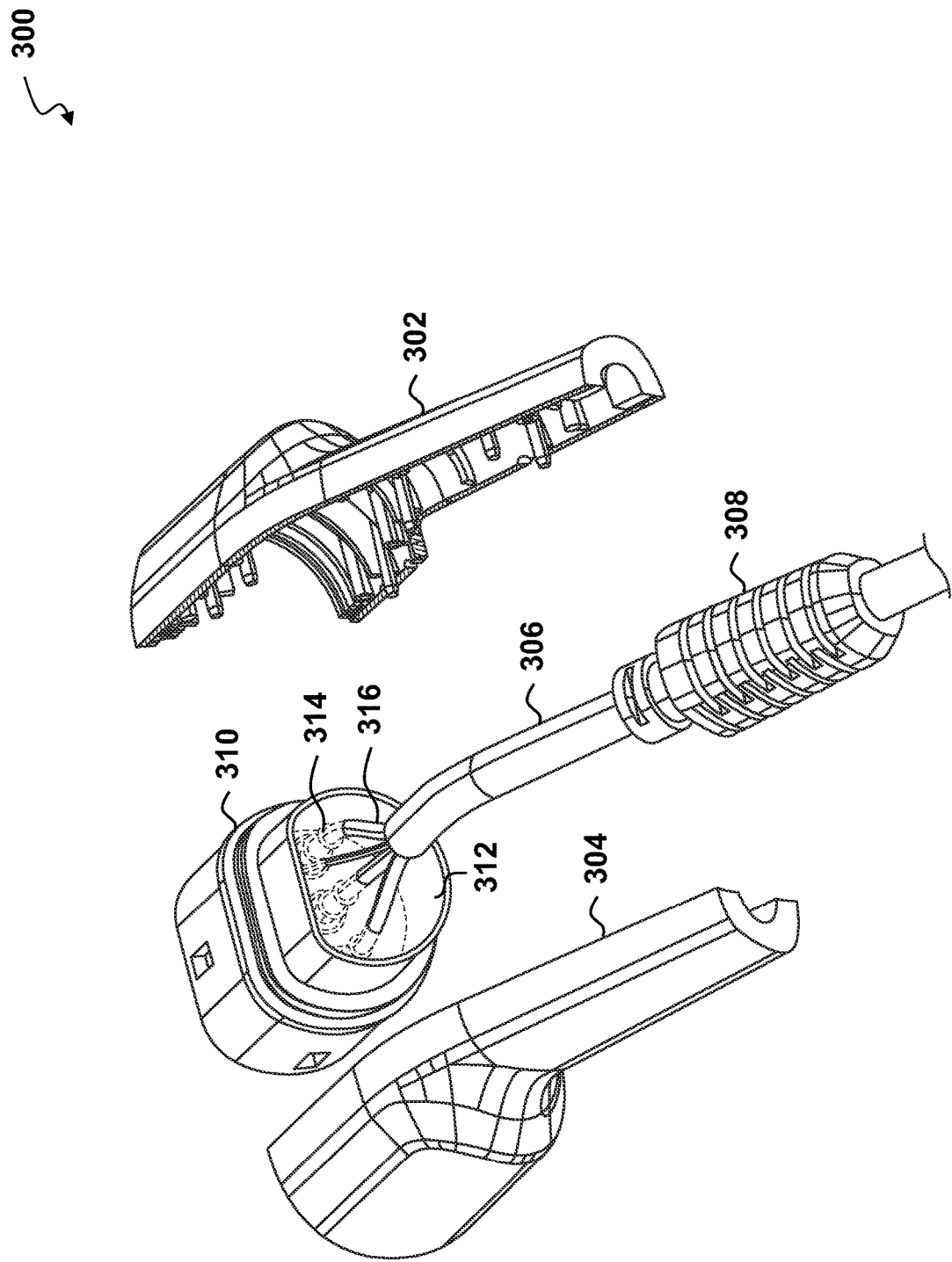
FIG. 14 depicts a perspective view of the alternate coupler of FIG. 13 with the housing shell detached, according to an embodiment of the disclosure.
Figure 15:
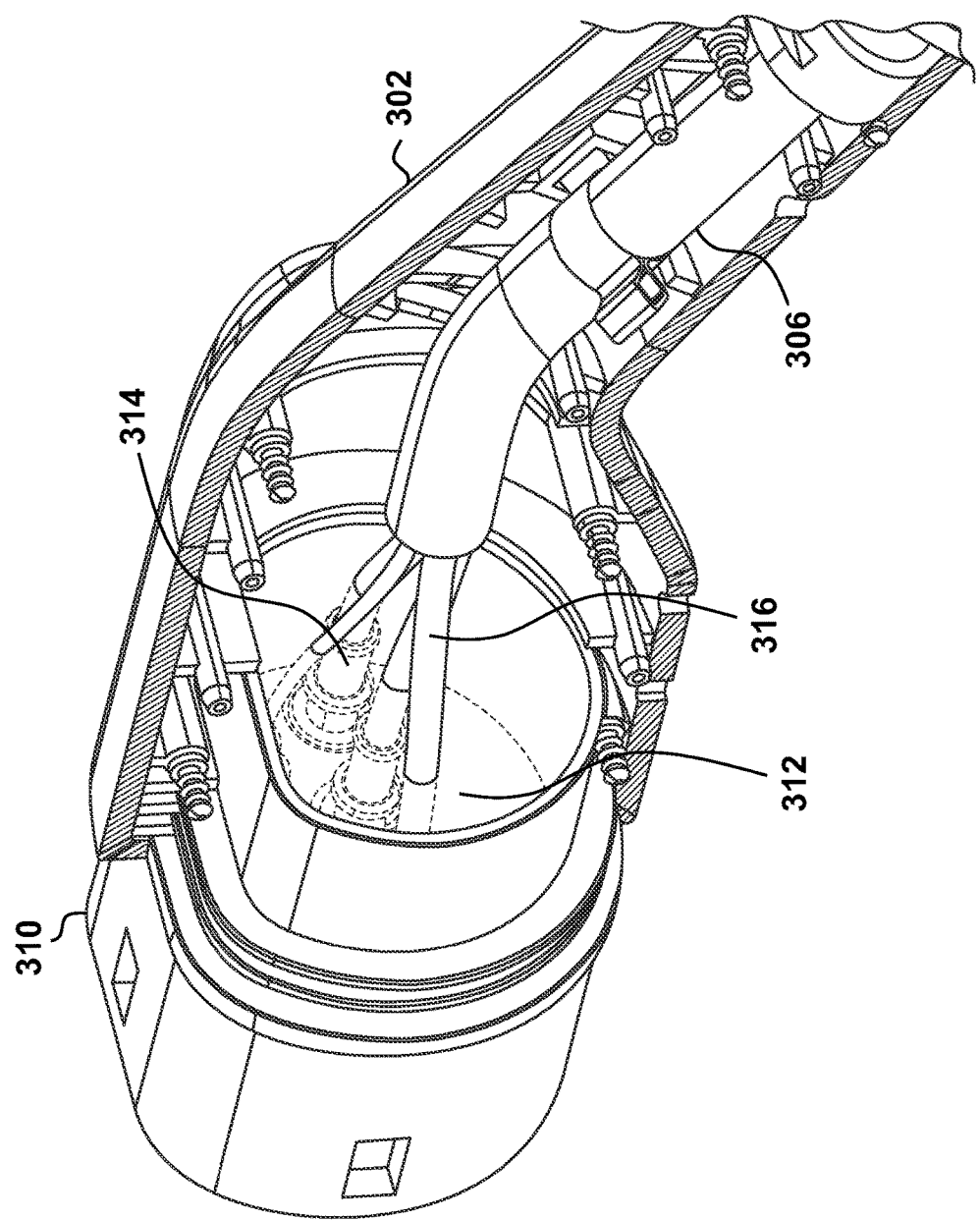
FIG. 15 depicts a perspective view of the alternate coupler of FIG. 13 with one side of the housing shell detached, according to an embodiment of the disclosure.

Referring to FIGS. 13, 14, and 15, an alternate coupler 300 is shown, according to an embodiment of the disclosure. FIG. 13 depicts a perspective exploded view of the alternate coupler 300 with a hot melt portion in a key connection area. FIG. 14 depicts a perspective view of the alternate coupler 300 of FIG. 13 with the housing shell detached. FIG. 15 depicts a perspective view of the alternate coupler 300 of FIG. 13 with one side of the housing shell detached.

As with the alternate coupler 200 of FIGS. 7, 8, 9, 10, and 11, the alternate coupler 300 may include a molded plastic housing shell 302, 304 such that no, or minimal, hot melt is visible to a user of the alternate coupler 300.

The alternate coupler 300 may include a connector portion 310. The connector portion 310 may include a socket for interfacing with an EV. The socket may include an inner surface defining a chamber. One or more pins may be disposed within the chamber. The one or more pins are adapted to extend inside a corresponding one or more receptacles, such as in an EV. The one or more pins may be electrically connected to the cable 306 via one or more terminals 314. The cable 306 may include a strain relief 308. The strain relief 308 may be disposed about at least a portion of the cable 306 so as to minimize bending of the cable 306 proximate the housing shell 302, 304 and prolong the lifespan of the cable 306.

The cable 306 may contain one or more wires 316 disposed within a jacket of the cable 306. The one or more wires 316 may be connected to the one or more terminals 314 so as to provide power and/or data connections from the cable to the connector portion 310 and to a connected EV or other device.

The connection between the one or more wires 316 of the cable 306 and the one or more terminals 314 may be encapsulated in hot melt 312. In one embodiment, the one or more wires 316 of the cable 306 may be connected to the one or more electrical connectors. Hot melt 312 may then fill a cavity of the connector portion 310 so as to encapsulate the connection between the cable 306 and the one or more terminals 314. The housing shell 302, 304 may then be attached to the connector portion 310. In some embodiments, one part of the housing shell 302, 304 may be attached to the connector portion 310 prior to adding the hot melt 312. The hot melt 312 prevents water intrusion, dust, and chemicals from reaching the connection between the one or more wires 316 of the cable 306 and the one or more terminals 314. The hot melt 312 also prevent the one or more wires 316 of the cable 306 from detaching from the one or more terminals 314 due to impact, pulling, or other forces on the alternate coupler 300.

A user of the alternate coupler 300 may be unaware of the use of the hot melt 312 as the hot melt 312 is contained within the housing shell 302, 304 and is not otherwise visible to the user. Therefore, the alternate coupler 300 can provide superior water-resistance, UV-protection, impact resistance, and chemical resistance as compared to a standard coupler while maintaining a desired outside appearance to the user.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A coupler comprising:
   a bend relief for a cable including one or more wires therein;

a socket comprising one or more pins and one or more socket terminals, wherein the one or more pins are configured to be electrically connected to the one or more socket terminals;

a spacer disposed adjacent to the bend relief, wherein a cable sheath is terminated proximate the spacer, wherein the spacer is configured to provide compression at the cable such that the spacer inhibits a flow of hot melt into the cable;

a housing body configured to be disposed between the bend relief and the socket, wherein at least a portion of the housing body comprises hot melt such that the at least the portion of the housing body substantially encapsulates a portion of the bend relief, the one or more socket terminals, and the one or more wires connected to the one or more socket terminals;

a locking mechanism configured to secure the coupler to an electric vehicle (EV) connector; and a locking feature, wherein the locking feature is an aperture disposed in the housing body, and wherein inserting a lock into the locking feature is configured to prevent movement of the locking mechanism.

2. The coupler of claim 1, wherein the socket comprises a chamber defined by an inner surface of the socket.

3. The coupler of claim 2, wherein at least a portion of the one or more pins are disposed within the chamber, and wherein the one or more pins are configured to be electrically connected to the cable.

4. The coupler of claim 1, wherein the housing body is formed by injecting the hot melt into a mold in an opening between the socket and the bend relief.

5. The coupler of claim 4, wherein the hot melt is injected at a range from 20 to 500 psi.

6. A coupler comprising:

a bend relief for a cable including one or more wires disposed therein;

a socket, wherein the socket comprises one or more pins and one or more socket terminals, wherein the one or more pins are configured to be electrically connected to the one or more socket terminals;

a housing body configured to be disposed between the bend relief and the socket, wherein at least a portion of the housing body comprises hot melt such that the housing body substantially encapsulates a portion of the bend relief, the one or more socket terminals, and the one or more wires connected to the one or more socket terminals;

a locking mechanism configured to secure the coupler to an electric vehicle (EV) connector; and a locking feature comprising an aperture disposed in the housing body, wherein a portion of the locking mechanism moves into a portion of the locking feature during at least one of: engaging the coupler to the EV and disengaging the coupler from the EV.

7. The coupler of claim 6, wherein the cable comprises a spacer disposed proximate the bend relief.

8. The coupler of claim 6, wherein the cable comprises a spacer disposed proximate the bend relief, wherein the spacer is configured to provide compression at the cable such that the spacer inhibits a flow of hot melt into the cable.

9. The coupler of claim 6, wherein the socket comprises a chamber defined by an inner surface of the socket.

10. The coupler of claim 9, wherein at least a portion of the one or more pins are disposed within the chamber, and wherein the one or more pins are electrically connected to the cable.

11. The coupler of claim 6, wherein inserting a lock into the locking feature prevents movement of the locking mechanism.

12. The coupler of claim 6, wherein the housing body is formed by injecting the hot melt into a mold in an opening between the socket and the cable.

13. The coupler of claim 12, wherein the hot melt is injected at a range from 20 to 500 psi.

* * * * *